W. Perry
Treating Offal.
No. 2,663. Reissued Jun. 25, 1867.
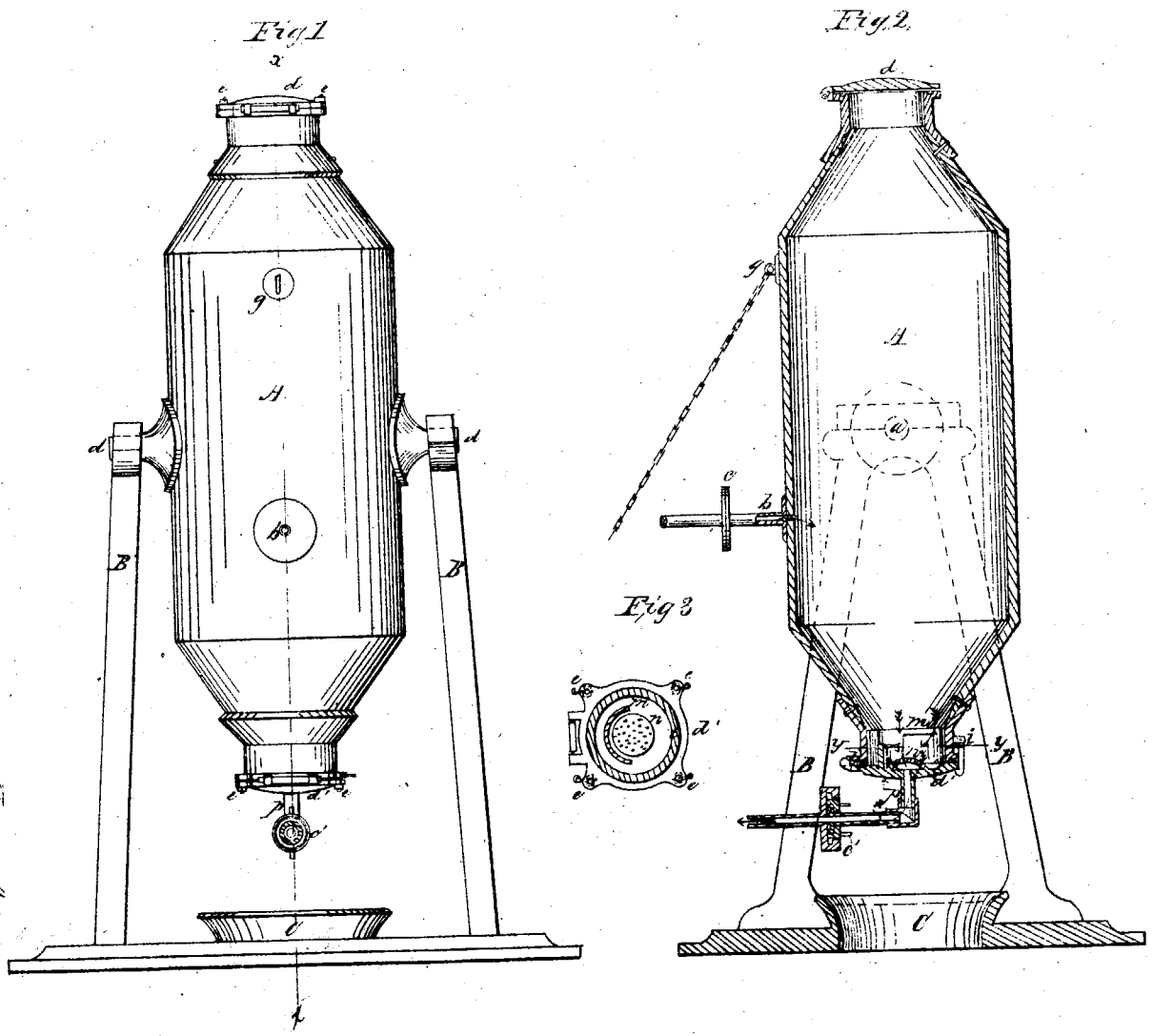
Witnesses,
Thos Fuchs
J A Lerow
Inventor
Hm Perry
Per Munn & Co
Attorneys.

BEST AVAILABLE COPY

United States Patent Office.

WILLIAM PERRY, OF NORTH BRIDGEWATER, MASSACHUSETTS.

*Letters Patent No.* 62,439, *dated February* 26, 1867; *reissue No.* 2,663, *dated June* 25, 1867.

IMPROVED STEAM DIGESTER FOR TREATING BONES, FISH, AND OTHER SUBSTANCES.

The Schedule referred to in these Letters Patent and making part of the same.

TO ALL WHOM IT MAY CONCERN:

Be it known that I, WILLIAM PERRY, of North Bridgewater, in the county of Plymouth, and State of Massachusetts, have invented a new and useful improvement in a Steam Digester for Treating Bones, Fish, and other Animal or Vegetable Matter; and I do hereby declare that the following is a full, clear, and exact description thereof, which will enable others skilled in the art to make and use the same, reference being had to the accompanying drawings forming a part of this specification, in which—

Figure 1 is a side elevation of my improved digester.

Figure 2 is a longitudinal central section, taken in the line *x x*, fig. 1.

Figure 3 is a horizontal section, taken in the line *y y*, fig. 2.

Similar letters of reference indicate like parts.

This invention relates to improvements in constructing a retort or digester for the treatment of animal bones with steam, to soften and prepare them for grinding into a fine powder for use as a fertilizer. To effect this object thoroughly, it is necessary that the bones shall be constantly exposed to the direct action of steam from the boiler for a period of eight or ten hours, and that no portion of them shall be covered by the water of condensation, which would cover the bones in the bottom of the retort, and prevent the access of the steam to them. Provision is made, therefore, by my improvements, for constantly draining the contents of the retort, and blowing off the water of condensation, together with the fatty and gelatinous matters in the bones, which are dissolved by the steam, while the bones themselves remain in the retort to be constantly subjected in every part thereof to the action of a fresh supply of steam. Without this provision, that part of the bones which would be covered by the water of condensation could be only partially cooked or softened in a short time, so as to grind readily into powder, and be made soluble so as to serve the purpose of a quickly-acting fertilizing agent, or an active pabulum of plants. Convenient and effective steam-tight heads or caps are also required over the openings for charging the digester or retort with the crude bones at the top, and discharging them at the bottom.

The invention may also be employed with advantage for treating fish and for rendering tallow, lard, and other vegetable or animal fats or extracts, and for extracting tannin from bark for tanning purposes.

A is a cylindrical retort, made of boiler iron, large enough to contain three or four tons of raw bones, and in the form of truncated cones at the ends. It is suspended centrally by trunnions *a a* on a gallows, or any other suitable frame, B. The trunnions, or either of them, may be made hollow, to introduce steam into the retort, or it may be conveyed into it by a pipe, *b*, on the side, provided with a steam-tight coupling, *c*, which may be readily disengaged when it is desired to turn the retort upon the trunnions, as will sometimes be necessary to clear it out thoroughly. For this purpose a chain or rope is attached to a staple, *g*, on the upper end. On each end of the retort are steam-tight heads or caps, *d* being at the upper charging end, and *d'* being at the lower discharging end, both of which cap covers are hung on hinges and secured by tightening-bolts and keys *e e* upon flanges on the ends of the retort. On the face of each of the heads of the retort is an annular groove, *i*, for a rubber or other suitable packing, to render the caps steam-tight when closed. The cap *d'* is provided on the inside with a circular stopper, *m*, which projects upward, when the cap is closed, into the discharge opening in the retort A, as shown in fig. 2, and also with a perforated diaphragm or strainer, *n*, in the middle, which covers the end of the ejection pipe *p*, which conveys the water of condensation and the matters dissolved and extracted from the bones away from the retort. On the ejection pipe *p* is a steam-tight coupling, *c'*, similar to the coupling *c*, on the induction pipe *b*, for the purpose of disengaging when the cap cover *d'* is opened to discharge the bones into a hopper, C, placed below, and for upsetting the retort, as before stated. The stopper *m* is so constructed as not to fit the discharge opening tight, but with passage-way enough left at the sides for the water of condensation and other liquid matters, while at the same time the stopper supports the mass of the bones in the retort, and prevents them from coming through upon the diaphragm *n*, which is also intended to shut off any small particles of bones while the liquid matter shall escape through the pipe *p*. This separation of the liquid matter is not only necessary for the proper treatment of the bones, as previously stated, to reduce them readily to a fine powder, but the fatty and gelatinous substances are separated in this manner

BEST AVAILABLE COPY for distinct uses, while the bones are rendered perfectly friable by the steam, and are crushed and ground into powder as a fertilizing agent. The general operation is manifest.

Having described my invention, what I claim as new, and desire to secure by Letters Patent, is—

1. I claim a steam digester for treating bones, fish, bark, &c., which is made and operating substantially as herein shown and described.

2. I claim the combination of the suspended retort or digester A. and the hinged steam-tight caps *d d'*, on the charging and discharging openings, substantially arranged and employed as and for the purposes herein described.

3. I claim also the stopper *m*, and the diaphragm *n*, in combination with the discharging cap *d'*, and the ejection pipe *p*, arranged and operating substantially as and for the purposes specified.

4. I claim also the steam-tight couplings *e* and *e'*, on the pipes *b* and *p*, respectively, in combination with the suspended retort A, for disconnection therewith, as and for the purposes herein described.

WM. PERRY.

Witnesses:

T. K. MILLETT,

A. M. MILLETT.